Patented Dec. 11, 1923.

1,477,058

UNITED STATES PATENT OFFICE.

ARTHUR EARL HOULEHAN, OF WILMINGTON, DELAWARE, ASSIGNOR TO E. I. DU PONT DE NEMOURS AND COMPANY, OF WILMINGTON, DELAWARE, A CORPORATION OF DELAWARE.

PROCESS FOR THE PREPARATION OF CATALYTIC COMPOUNDS AND THE PRODUCT OBTAINED THEREBY.

No Drawing.   Application filed May 25, 1917. Serial No. 170,809.

*To all whom it may concern:*

Be it known that I, ARTHUR EARL HOULEHAN, of Wilmington, in the county of New Castle and in the State of Delaware, have invented a certain new and useful Improvement in Processes for the Preparation of Catalytic Compounds and the Product Obtained Thereby, and do hereby declare that the following is a full, clear, and exact description thereof.

My invention relates particularly to catalytic compounds useful in treating aromatic or paraffin hydrocarbons and particularly in transforming higher boiling hydrocarbons into lower boiling hydrocarbons, as for example, the production of toluol from xylols or commercial xylol. Generally speaking the new process comprises mixing aluminum with a liquid hydrocarbon and then introducing an acid such as hydrogen chloride or its equivalent.

The object of my invention is to produce a catalytic agent of the above character which is suitable especially for use in connection with the processes set forth in my two applications for Letters Patent Serial Nos. 170,810 and 170,811, filed May 25th, 1917, entitled Process for the manufacture of lower boiling hydrocarbons from higher boiling hydrocarbons, and Process for the production of lower boiling hydrocarbons from higher boiling hydrocarbons, filed on even date herewith. As set forth in said applications for Letters Patent, anhydrous aluminum chloride, when introduced into the hydrocarbons combines with a portion thereof to form a catalytic compound which is the active agent in changing the higher boiling hydrocarbons to the lower boiling hydrocarbons. The most usual method of forming this catalytic compound consists in adding the dry anhydrous salt to the hydrocarbon to be treated. This necessitates the preparation of the solid salt by any of the well-known methods. But the manufacture and isolation of the solid salt offers considerable difficulties owing to its corrosive and hygroscopic nature. The object of my invention is to produce this catalytic compound without first isolating the solid anhydrous salt.

While my invention may be carried out in several different ways, for the purposes of illustration I shall describe only one way hereinafter.

For example, I may proceed as follows: Metallic aluminum, in order that it may present a large surface to the acid, is first made into thin sheets preferably by dropping the molten metal on a highly polished revolving plate. The aluminum sheets are then placed in a suitable reaction vessel and covered with a hydrocarbon oil, as for example, metaxylol. The hydrocarbon oil used will depend upon the particular catalytic compound it is desired to manufacture. A stream of dry hydrogen chloride is then introduced by means of a pipe extending down to within a few inches of the bottom of the reaction vessel, which acts upon the metal converting it first into aluminum chloride, which then combines with the hydrocarbon to form the catalytic compound. The hydrochloric acid is preferably conducted into the liquid until all the aluminum is converted into the catalytic compound. The heating of the reaction, which is exothermic, causes a considerable rise in the temperature of the mixture, the reagents at the beginning of the process being at ordinary room temperature. The catalytic compound prepared in this manner is a dark brownish red liquid which is immiscible with further portions of the hydrocarbon, but is capable of acting as a catalyst of the breaking down of additional quantities of hydrocarbon. By this means a large quantity of catalytic compound can be prepared at once, and can be conveniently handled and stored, thus avoiding the preparation and handling of the solid anhydrous aluminum chloride.

While I have described my invention above in detail, I wish it to be understood that many changes may be made therein without departing from the spirit of my invention.

I claim:

1. The process of producing a catalytic compound which comprises mixing metallic aluminum with a liquid hydrocarbon, introducing dry hydrogen chloride, and stopping the reaction when a substantial proportion of the aluminum is combined with the hydrocarbon as evidenced by the formation of a liquid immiscible in further portions of said hydrocarbon.

2. The process of producing a catalytic compound which comprises mixing a liquid hydrocarbon with metallic aluminum in such a form as to present a large surface, then introducing hydrogen chloride, and discontinuing the introduction of hydrogen chloride when a substantial proportion of the aluminum exists in combination with the hydrocarbon and before substantial conversion of said hydrocarbon into another hydrocarbon has occurred, the product at this point being immiscible in further portions of said hydrocarbon.

3. The process of producing a catalytic compound which comprises mixing metallic aluminum with a xylol, introducing dry hydrogen chloride, and stopping the reaction when a substantial proportion of the aluminum is combined with the xylol, as evidenced by the formation of a dark brownish red liquid immiscible in further portions of xylol.

4. The process of producing a catalytic compound which comprises mixing metallic aluminum with a xylol, introducing dry hydrogen chloride, and stopping the reaction when the aluminum is present in the form of a xylol-aluminum chloride compound, having a dark brownish red color and being immiscible in further portions of xylol.

5. The process of producing a catalytic compound which comprises mixing xylols with metallic aluminum in such a form as to present a large surface, introducing hydrogen chloride, and stopping the reaction when a substantial proportion of the aluminum is present in the form of a xylol aluminum chloride compound and before the xylols, in substantial proportions, become converted into other hydrocarbons, the product at this point being a dark brownish red liquid immiscible in further portions of xylol.

6. The process of producing a catalytic compound which comprises mixing metallic aluminum with metaxylol, introducing dry hydrogen chloride, and discontinuing the introduction of hydrogen chloride when a substantial proportion of the aluminum exists in chemical combination with metaxylol as evidenced by the formation of a dark brownish red liquid immiscible in further portions of meta-xylol and capable of effecting the catalytic conversion of xylol to toluol.

7. As a new product, an organic aluminum compound obtainable by bringing hydrogen chloride into contact with aluminum immersed in a hydrocarbon consisting chiefly of xylol, said compound being a dark brownish red liquid immiscible in further portions of said hydrocarbon and being capable of effecting the catalytic conversion of xylol to toluol.

In testimony that I claim the foregoing I have hereunto set my hand.

ARTHUR EARL HOULEHAN.

Witnesses:
A. M. GORMAN,
P. E. STRICKLAND.